US006438682B1

United States Patent
Morris et al.

(12)
(10) Patent No.: US 6,438,682 B1
(45) Date of Patent: Aug. 20, 2002

(54) METHOD AND APPARATUS FOR PREDICTING LOOP EXIT BRANCHES

(75) Inventors: Dale Morris, Menlo Park; Mircea Poplingher, Campbell; Tse-Yu Yeh, Milpitas; Michael P. Corwin, Palo Alto; Wenliang Chen, Sunnyvale, all of CA (US)

(73) Assignee: Intel Corporation, Santa, CA (US)

( * ) Notice: Subject to any disclaimer, the term of this patent is extended or adjusted under 35 U.S.C. 154(b) by 0 days.

(21) Appl. No.: 09/169,866

(22) Filed: Oct. 12, 1998

(51) Int. Cl.[7] ................................................. G06F 9/32
(52) U.S. Cl. ....................................................... 712/241
(58) Field of Search .................................... 721/239, 241

(56) References Cited

U.S. PATENT DOCUMENTS 5,926,634 A * 7/1999 Isaman ........................ 395/586

* cited by examiner

*Primary Examiner*—David Y. Eng
(74) *Attorney, Agent, or Firm*—Leo V. Novakoski (57) ABSTRACT

A loop branch prediction system is provided to predict a final iteration of a loop and resteer an associated fetch module to an appropriate target address. The loop prediction system includes a counter and an end of loop (EOL) module. In one mode, the counter tracks loop branches in process. When a termination condition is detected, the counter switches to a second mode to track the number of loop branches still to be issued. The EOL module compares the number of loop branches still to be issued with one or more threshold values and generates a resteer signal when a match is detected.

23 Claims, 6 Drawing Sheets

METHOD AND APPARATUS FOR PREDICTING LOOP EXIT BRANCHES

BACKGROUND OF THE INVENTION

1. Field of the Invention

The present invention relates to the field of microprocessors, and in particular, to systems and methods for branch prediction in microprocessors.

2. Background Art

Advanced processors employ pipelining techniques to execute instructions at very high speeds. On such processors, the overall machine is organized as a pipeline consisting of several cascaded stages of hardware. Instruction processing is divided into a sequence of operations, and each operation is performed by hardware in a corresponding pipeline stage ("pipe stage"). Independent operations from several instructions may be processed simultaneously by different pipe stages, increasing the instruction throughput of the pipeline. Where a pipelined processor includes multiple execution resources in each pipe stage, the throughput of the processor can exceed one instruction per clock cycle. To make full use of this instruction execution capability, the execution resources of the processor must be provided with sufficient instructions from the correct execution path.

Branch instructions pose major challenges to keeping the pipeline filled with instructions from the correct execution path. When a branch instruction is executed and the branch condition met, control flow of the processor jumps to a new code sequence, and instructions from the new code sequence are transferred to the pipeline. Branch execution typically occurs in the back end of the pipeline, while instructions are fetched at the front end of the pipeline. If changes in the control flow are not anticipated correctly, several pipe stages worth of instructions may be fetched from the wrong execution path by the time the branch is resolved. When this occurs, the instructions must be flushed from the pipeline, leaving idle pipe stages (bubbles) until the processor refills the pipeline with instructions from the correct execution path.

To reduce the number of pipeline bubbles, processors incorporate branch prediction modules at the front ends of their pipelines. When a branch instruction enters the front end of the pipeline, the branch prediction module forecasts whether the branch instruction will be taken when it is executed at the back end of the pipeline. If the branch is predicted taken, the branch prediction module indicates a target address to which control of the processor is predicted to jump. A fetch module, which is also located at the front end of the pipeline, fetches instructions beginning at the indicated target address.

Branch instructions are employed extensively in loops to execute a series of instructions ("the loop body"), repeatedly. Modulo-scheduled loops are loops that are organized in a pipelined manner to improve execution efficiency. For one type of loop (top loop), a branch condition is tested following each iteration and control is returned to the first instruction of the loop body if the branch condition is met. The last iteration of the loop occurs when the branch condition is not met, in which case control of the processor passes ("falls through") to the instruction that follows the loop branch. Thus, the loop branch is taken for all but the final iteration of the top loop. Top loops terminate when the loop branch is not taken. Another type of loop (exit loop) employs a branch at a location other than the end of the loop body. In this case, the loop branch is not taken for all but the final iteration of the loop. Exit loops terminate when the loop branch is taken.

Loops are very common programming structures, and branch prediction systems are typically designed to predict the loop branch conditions correctly for the bulk of the loop iterations. For example, the branch prediction system may be set up to automatically predict top loop branches as taken and exit loop branches as not taken. This strategy provides accurate branch predictions for all but the last iteration of each loop, when the loop condition changes.

Given the ubiquity of loop structures, mispredicting the loop branch on just the terminal iteration can have a significant impact on the overall performance of the processor. This is especially true where the loop is nested within an outer loop, when the loop count is small, or when the loop body is small. In the first case, the misprediction penalty associated with the terminal iteration of the inner loop is repeated for each iteration of the outer loop. In the latter cases, the misprediction penalty may exceed the total number of cycles necessary to execute the loop.

The present invention addresses these and other limitations associated with available branch prediction systems.

SUMMARY OF THE INVENTION

The present invention provides a system and method for predicting loop branches, including the loop branch that terminates the loop.

In accordance with the present invention, a loop prediction system includes a counter module, a control module, and an end_of_loop (EOL) module. The counter tracks the number of loop branches that are in process. The control module determines when loop termination approaches, and switches the counter to track the number of loop branches that remain to be issued. The EOL module compares the number of loop branches that remain to be issued with a threshold value and generates a resteer signal when a match is detected.

For one embodiment of the invention, the counter is a dual mode counter that tracks the number of loop branches in process in a first mode and uses this number to track the number of loop branches that remain to be issued in the second mode. For another embodiment of the invention, the counter includes a first counter to track the number of loop branches in process and a second counter to track the number of loop branches that remain to be issued.

BRIEF DESCRIPTION OF THE DRAWINGS

The present invention may be understood with reference to the following drawings in which like elements are indicated by like numbers. These drawings are provided to illustrate selected embodiments of the present invention and are not intended to limit the scope of the invention.

DETAILED DISCUSSION OF THE INVENTION

The following discussion sets forth numerous specific details to provide a thorough understanding of the invention.

However, those of ordinary skill in the art, having the benefit of this disclosure, will appreciate that the invention may be practiced without these specific details. In addition, various well known methods, procedures, components, and circuits have not been described in detail in order to focus attention on the features of the present invention.

One of the difficulties of predicting the termination of a loop is that the branch instructions that control looping and update various loop status counters are resolved at the back end of the processor pipeline. Given the number of pipe stages in contemporary processors, timing constraints preclude any direct use of these loop status counters and other architectural data to anticipate a loop's termination and resteer the pipeline appropriately. To be effective, loop terminations and the consequent pipeline resteers should be predicted from information available at the front end of the pipeline, where the instruction fetch module can be resteered soon after the last loop branch enters the pipeline.

The present invention provides a loop branch prediction system that allows the terminal branch of a loop to be accurately predicted at the front end of the processor pipeline. This is accomplished by monitoring loop branch instructions that are in-flight (issued but not yet retired) and available loop data to determine the number of loop branches that are still to be issued. This number is updated to reflect loop branches as they issue and compared with one or more threshold values. When the number reaches a threshold value, termination of the loop is indicated.

For one embodiment, a default loop branch prediction is over-ridden when the threshold value is reached, and the fetch module is resteered to the instruction that follows the loop. The default branch prediction for a top loop branch is, for example, that the branch is "taken" ("TK"). This is overridden to "not taken" ("NT") when the threshold value is reached. The threshold value may correspond to zero, one, or two loop branches, depending on the type of loop involved and timing constraints for the processor pipeline.

Figure 1:
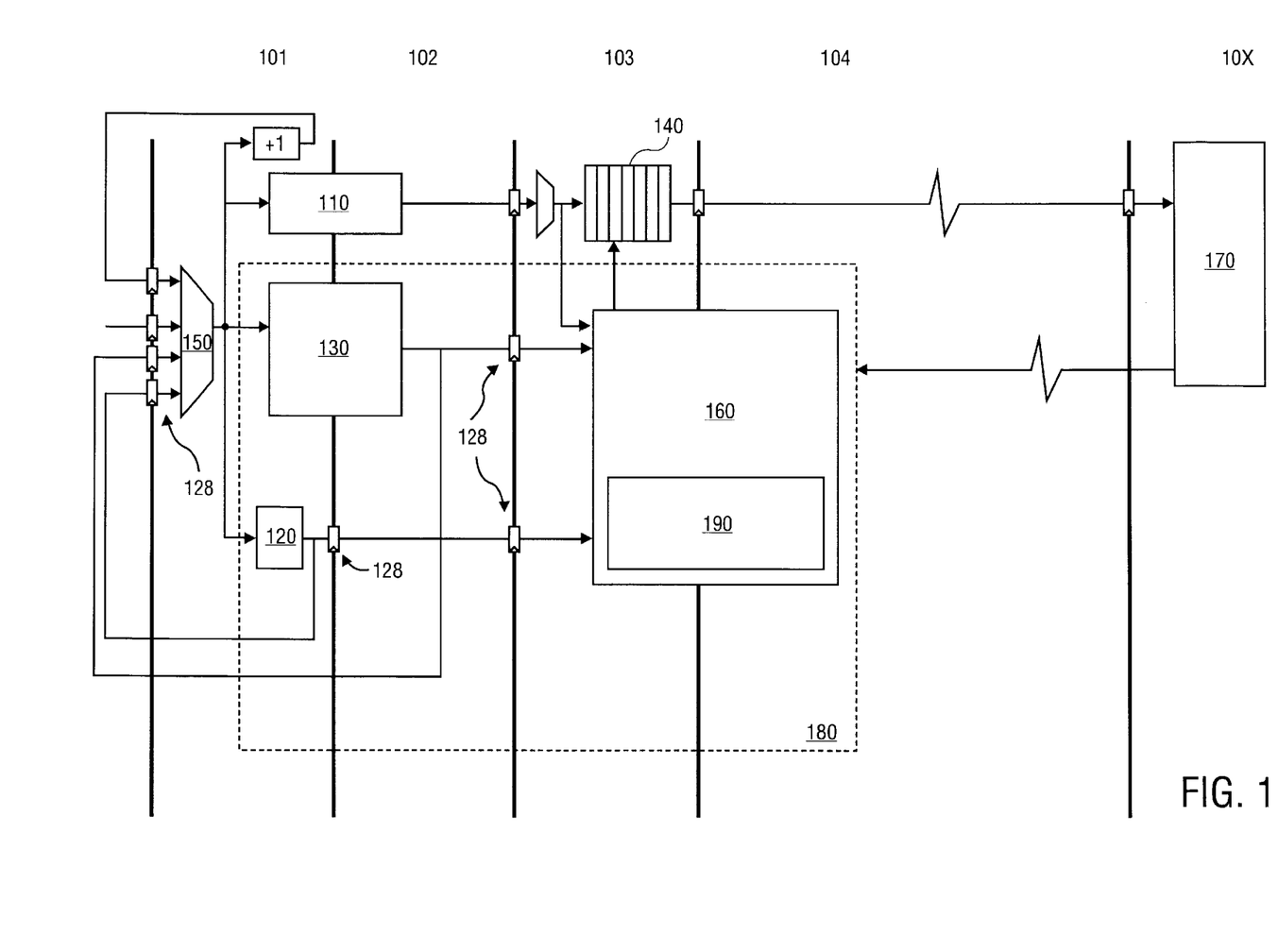
FIG. 1 is a block diagram of a processor pipeline including a loop branch prediction system in accordance with the present invention.

FIG. 1 is a block diagram of a processor pipeline 100 that includes branch prediction system 180 suitable for use with the present invention. Pipeline 100 is represented as a series of pipeline ("pipe") stages 101-10x to indicate when different resources operate on a given instruction. The last stage in FIG. 1 is labeled 10x to indicate that one or more pipe stages (not shown) my separate stage 10x from stage 104. Except as noted, signals propagate from left to right, so that the response of circuitry in, e.g., pipe stage 101 on CLK cycle N is propagated to the circuitry of pipe stage 102 on CLK cycle N+1.

Staging latches 128 control the flow of signals between pipe stages 101-10x. Other embodiments of the present invention may employ different relative configurations of branch prediction elements and staging latches 128. For example, the staging latches at the inputs of MUX 150 may be replaced by a single staging latch at its output. The present invention is independent of which relative configuration is employed.

Loop branch prediction system 190 is shown as part of branch prediction system 180, which also includes a first branch prediction structure (BPS1) 120, a second branch prediction structure (BPS2) 130, and a branch decode module 160. A branch execution unit (BRU) 170, an instruction cache 110, an instruction pointer (IP) MUX 150, and an instruction register 140 are also shown in FIG. 1. The disclosed embodiment of loop prediction system 190 employs signals from BPS1 120, decode logic 160, and BRU 170 to anticipate the final iteration of a loop and to resteer processor pipeline 100 to the instruction that follows the loop.

IP MUX 150 couples a selected IP to I-cache 110, BPS1 120, and BPS2 130. On receipt of the IP, I-cache 110, BPS1 120 and BPS2 130 perform their respective look-up procedures to determine whether they have an entry corresponding to the received IP. When an IP hits, e.g. matches, an entry in I-cache 110, data at the associated entry (the instruction pointed to by the IP) is forwarded to the next stage in pipeline 100. When an instruction hits in BPS1 120 or BPS2 130, branch prediction information is coupled back to IP MUX 150 and branch decode module 160 is notified.

In the disclosed embodiment of branch prediction system 180, BPS1 120 and BPS2 130 are two structures in a branch prediction hierarchy that is designed to provide rapid resteering of pipeline 100. For one embodiment, BPS1 120 accommodates branch prediction information for a limited number of loop branch instructions. An embodiment of BPS1 120 having four fully associative entries indexed by partial IPs may support single cycle (zero bubble) resteers. The target addresses of selected top loop branches may be stored in BPS1 120 to resteer pipeline 100 on the repeated iterations of the loop body. An embodiment of BPS2 130 may store predicted resolution and target address information for 64 entries in a four way set associative configuration.

The present invention does not require a particular branch prediction hierarchy as long as target addresses can be provided for timely pipeline resteers. For example, a single storage structure for branch prediction information may be employed in place of PBS1 120 and BPS2 130. An advantage of the hierarchy in the disclosed embodiment is that it reduces the some of the timing constraints imposed on loop branch predictions.

Branch decode module 160 maintains the branch prediction information in BPS1 120 and BPS2 130 and provides information to loop predictor 190 on the types of instructions in buffer 140. Decode module 160 may also implement checks on various branch related information to facilitate uninterrupted processing of branch-related instructions. Branch-related instructions include various types of branch instructions as well as instruction that deliver prediction information to BPS1 120 and BPS2 130. Decode module 160 includes logic to decode branch-related instructions in buffer 140 and update BPS1 120, BPS2 120 (BR structures), and loop predictor 190 accordingly.

Buffer 140 provides instructions received from, e.g., I-cache 110 to resources in the back end of pipeline 200. These resources include BRU 170, which executes selected branch-related instructions and generates information to update the architectural state of the processor when and if the instruction is retired. For example, BRU 170 provides data for maintaining a loop counter (LC) and an epilog counter (EC) to track the status of loops in process. When a counted loop is detected, LC is initialized to a value indicating the number of times the counted loop will be iterated. For a modulo-scheduled ("software pipelined") loop, EC is initialized to a value indicating the number of stages in the software pipeline. Initial values of EC and/or LC may be determined by the compiler and provided to the processor through loop instructions.

For example, in a modulo-scheduled counted loop, LC is decremented on each iteration of the loop, reaching zero when the last loop branch, i.e. the last loop iteration, is detected. This signals the start of the epilog. EC is decremented as instructions are drained from the stages of the software pipeline on subsequent clock cycles. All instructions in the final iteration of the loop are complete when EC is zero. LC and EC may thus be used to determine when a modulo-scheduled counted loop is about to terminate. For non-pipelined counted loops, a threshold value of LC may be used to determine when loop termination approaches. For modulo scheduled "while" loops, the epilog begins when a predicate associated with the loop condition becomes zero. Loop termination for "while" loops may thus be indicated by the loop predicate and/or changes in EC.

Because BRU 170 is at the back end of pipeline 200 and branch prediction system 180 is at the front end of pipeline 200, it is not sufficient to monitor LC and EC to predict the termination of a loop. Given the multiple stages of pipeline 200, the final loop branch instruction will retire (and LC and/or EC will be updated) multiple clock cycles after pipeline 100 should have been resteered to the instruction sequence that follows the loop. A successful loop prediction scheme provides a termination prediction while loop branch instructions are still in process in pipeline 100. The largest performance benefit is obtained when the loop termination can be predicted soon after the final loop branch has entered pipeline 100.

Figure 2:
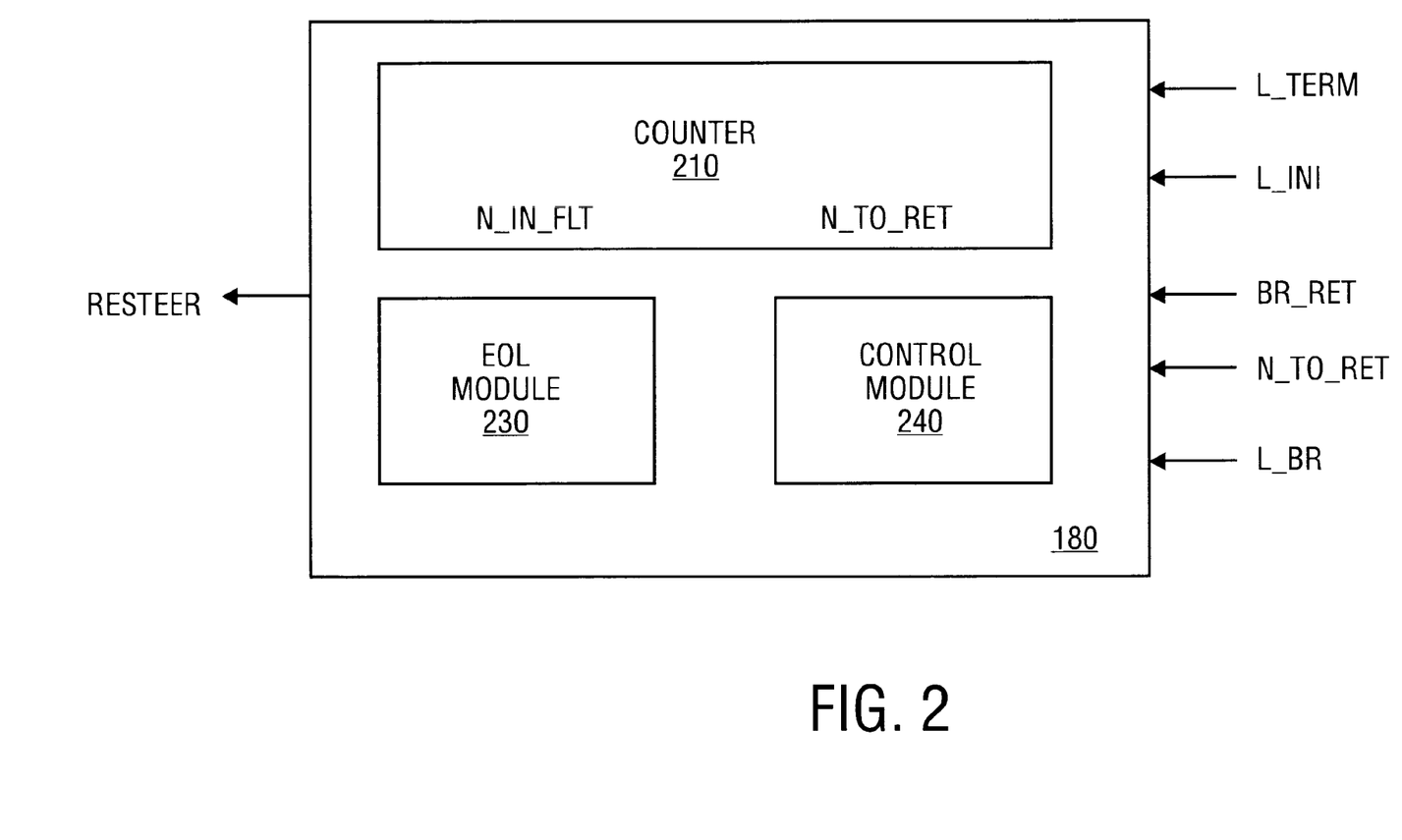
FIG. 2 is a block diagram of one embodiment of the loop prediction system of FIG. 1.

FIG. 2 is block diagram of one embodiment of loop predictor 190 of FIG. 1. The disclosed embodiment of loop predictor 190 includes a counter 210, an end_of_loop (EOL) module 230, and a control module 240. Counter 210 includes circuitry to track the number of loop branch instructions that are in process (N_IN_FLT) and the number of loop branch instructions yet to issue (N_TO_ISSUE).

For one embodiment of the invention, N_IN_FLT includes all loop branch instructions that have been loaded into buffer 140 but have not yet been retired. These may be tracked by incrementing N_IN_FLT when a loop branch is issued at the front end of pipeline 100 and decrementing N_IN_FLT when a loop branch is retired at the back end of pipeline 100. In the disclosed embodiment, a signal L_BR is asserted to counter 210 when a loop branch is issued, and a signal BR_RET is asserted to counter 210 when a loop branch retires.

For one embodiment of the invention, counter 210 begins tracking N_TO_ISSUE as the loop approaches its terminal iteration, signaling entry into termination mode. For example, N_TO_ISSUE may be determined by the difference between an expected number of loop branches still to be retired (N_TO_RET) and N_IN_FLT as termination mode is reached. Thereafter, N_TO_ISSUE is decremented for each additional loop branch issued, e.g. each time L_BR is asserted.

Figure 3A:
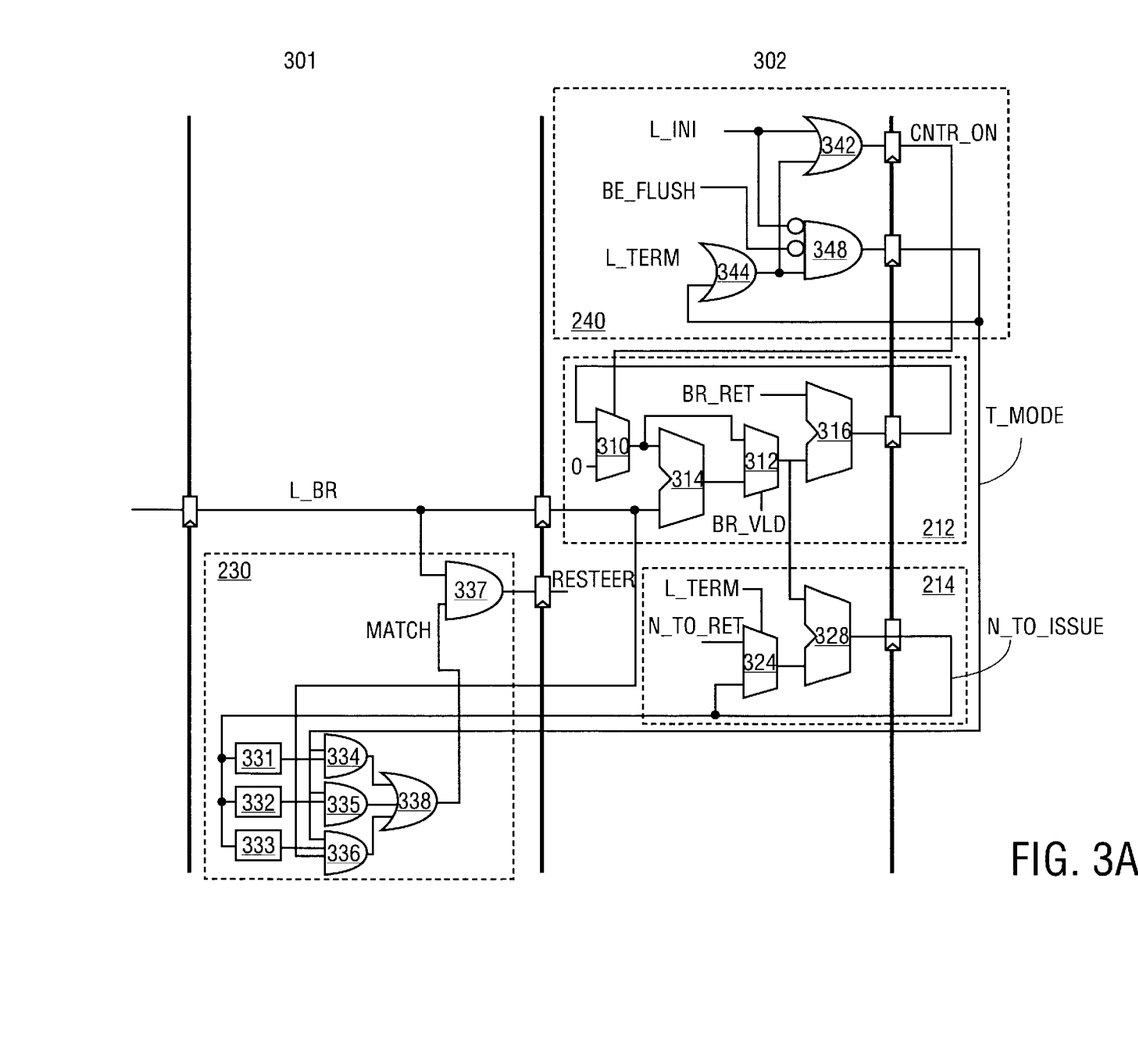
FIG. 3A is circuit diagram of one embodiment of the loop prediction system of FIG. 2.
Figure 3B:
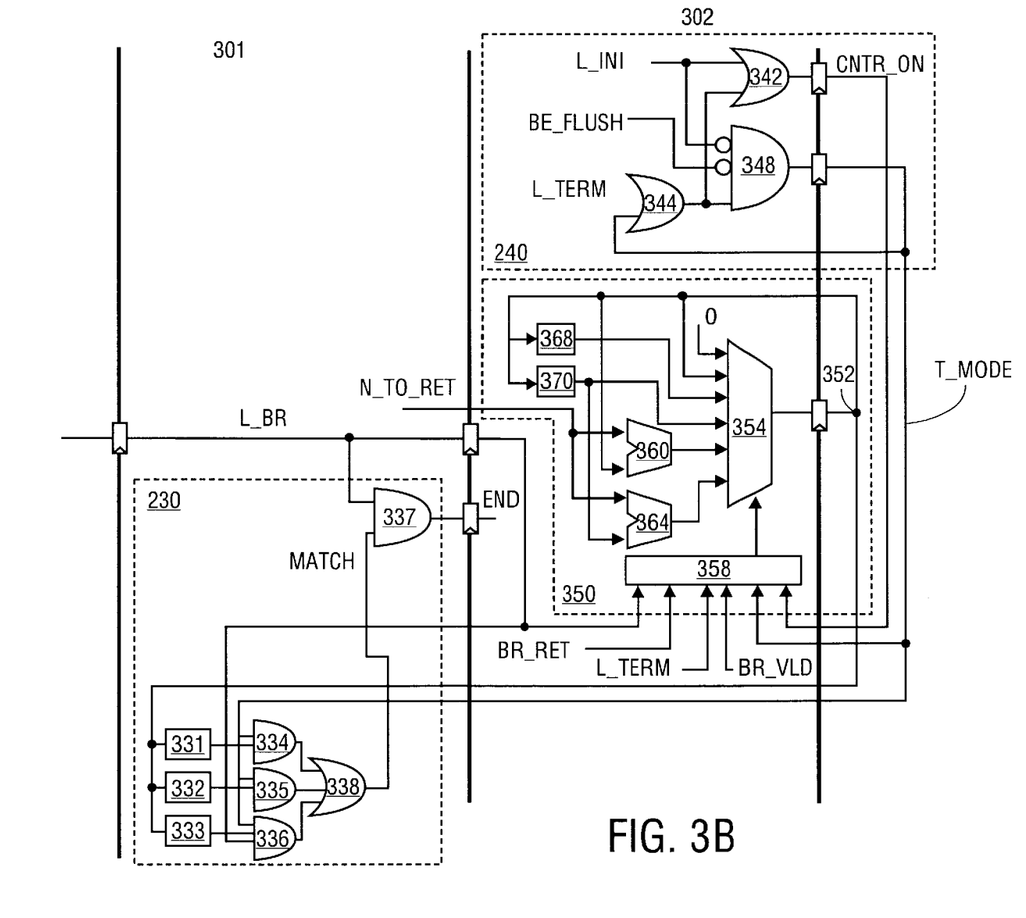
FIG. 3B is a circuit diagram of another embodiment of the loop prediction system of FIG. 2.

For one embodiment of the invention, counter 210 may be a dual mode counter in which N_IN_FLT is tracked in a first mode and N_TO_ISSUE is tracked in a second, e.g. termination, mode (FIG. 3B). For another embodiment of the invention, counter 210 may include separate counters to track N_IN_FLT and N_TO_ISSUE (FIG. 3A).

A switch between counting modes (or between counters) is triggered when the terminal iteration of a loop is approached. As noted above, the point at which the switch occurs may depend on the type of loop involved. For example, the approach of the terminal iteration for a counted loop may be indicated by a value of LC below a threshold value. The approach of termination for a modulo-scheduled counted loop, e.g. CEXIT or CTOP, may be indicated by a value of LC and/or EC below a threshold value. For modulo-scheduled while loops, e.g. WEXIT or WTOP, approach of the terminal iteration may be indicated by a value of EC below a threshold value and/or by a change in the state of the loop predicate.

For another embodiment of the invention, a predicted number of loop iterations may be used to determine when the terminal iteration is being approached. For example, processor 100 may store a number of iterations for recent loops. When one of these loops is encountered again, the difference between the current number of iterations and the predicted number of iterations (based on the previous encounter) may be compared with a threshold value. In this embodiment, termination mode is indicated when the difference falls below the threshold value.

In the dual mode implementation of counter 210, the counter is switched to termination mode when the terminal iterations of the loop approaches. In the two counter implementation of counter 210, a termination counter 214 (FIG. 3A) is activated. In both cases, the value of N_IN_FLT is used to initialize N_TO_ISSUE. The two counter implementation of counter 210 is discussed in conjunction with FIG. 3A. The dual mode implementation of counter 210 is discussed in conjunction with FIG. 3B.

For one embodiment, counter 210 is initialized to N_TO_ISSUE when termination mode is entered, using the current values of N_IN_FLT and N_TO_RET. N_TO_RET may be derived, for example, from LC and/or EC. Thereafter, N_TO_ISSUE is adjusted to reflect any new loop branch instructions that enter pipeline 100. The adjusted value represents the expected number of loop branches still to be issued before the termination of the loop.

EOL module 230 is coupled to monitor N_TO_ISSUE. EOL module 230 compares N_TO_ISSUE to one or more threshold values and generates a resteer signal when a match occurs. The threshold value used may depend on a number of factors, such as the type of loop being monitored and the timing necessary to resteer pipeline 100. When the loop terminates on a fall through branch, e.g. the loop branch is NT on the final iteration, the resteer address is just the address of the instruction that follows the loop branch in sequence. For one embodiment of the invention, resteer is accomplished by over-riding the default (branch taken) target address indicated by BPS1 120.

Control module 240 initiates tracking of N_IN_FLT, N_TO_RET, and triggers EOL module 230 as required. In one embodiment of the invention, control module 240 monitors instructions entering buffer 140 and initializes N_IN_FLT when a loop-start signal (L_INI) is asserted. For example, EC is typically initialized at the start of a modulo-scheduled loop by a MOV_TO_EC instruction. For counted loops, LC may also be initialized at this time by a MOV_TO_LC instruction. For one embodiment of the invention, L_INI is asserted to control module 240 when a MOV_TO_EC or MOV_TO_LC instruction is detected in buffer 140, depending on the loop type being monitored. L_INI may also be asserted on the first occurrence of a loop branch following a flush of the back end stages of pipeline 100. In this case, N_IN_FLT is reset to zero.

Control module 240 also receives a signal, L_TERM, which is asserted in response to the approach of a terminal iteration of a loop. For one embodiment, control module 240 deactivates an in-flight counter 212 (FIG. 3A) and activates EOL module 230 when L_TERM is asserted. For another embodiment, control module 240 switches counter modes (to termination mode) and activates EOL module 230 when L_TERM is asserted.

FIG. 3A is a schematic diagram showing one embodiment of a loop predictor pipeline 300 in accordance with the present invention. Loop prediction pipeline 300 is divided into pipeline stages ("pipe stages") 301 and 302 to indicate when various elements operate. Loop predictor pipeline 300 is illustrated with exemplary embodiments of counter 210, EOL module 230, and control module 240. The exemplary embodiment of counter 201 includes in-flight counter 212 and termination counter 214.

In the disclosed embodiment, control module 240 activates in-flight counter 212 and EOL module 230 in response to signals from various components of pipeline 100. Control module 240 includes first and second OR gates 342, 344, and an AND gate 348 with an inverted input. A OR gate 342 asserts a CNTR_ON signal to in-flight counter 212 when L_INI is asserted. OR gate 344 and AND 348 assert a termination mode signal (T_MODE) when L_TERM is asserted and L_INI is deasserted, e.g. when a loop that is in progress approaches termination. T_MODE is deasserted when L_INI is reasserted.

In-flight counter 212 is initialized by CNTR_ON to track the number of loop branches that are in process. In particular, in-flight counter 212 employs first and second MUXs 310, 312, respectively, and first adder 314 to track the number of valid loop branches loaded into, e.g., buffer 240. MUX 310 couples zeroes to a first input of adder 314 until CNTR_ON is asserted, after which it couples the output of in-flight counter 212 (N_IN_FLT) to the first input of adder 314. The second input of adder 314 is driven by a hit signal (L_BR) from BPS1 120, which increments N_IN_FLT when a loop branch hits in BPS1 120. In an alternative embodiment, BPS2 120 may be used to generate L_BR to in-flight counter 212, provided it can be done within the timing constraints of pipeline 300.

The incremented value of N_IN_FLT is coupled to one input of MUX 312, the other input of which receives an unincremented version N_IN_FLT (bypassed from MUX 310). MUX 312 couples the incremented or unincremented value of N_IN_FLT to a second adder 316, according to whether or not a valid loop branch is detected in pipe stage 302. This is indicated by BR_VLD, which may be set and reset by branch decoder 160 to confirm that the hit in BPS1 120 was generated by a valid loop branch.

A second adder 316 receives N_IN_FLT at its first input and a branch retirement signal (BR_RET) at its second input. BR_RET is asserted each time a loop branch is retired. It may be generated, for example, by BRU 170 or associated retirement logic. Second adder 316 decrements N_IN_FLT when a loop branch is retired (BR_RET asserted), while first adder 314 and MUX 312 increment N_IN_FLT when a valid loop branch is issued. N_IN_FLT thus represents the number of loop branches issued but not yet retired in pipeline 100.

Control module 240 updates N_IN_FLT in this manner until L_TERM is asserted, causing loop predictor 160 to enter termination mode (T_MODE asserted). When termination mode is initiated, the latest value of N_IN_FLT is provided to terminal counter 214, which uses it to determine a number of loop branches yet to be issued (N_TO_ISSUE). In termination mode, adder 314 and MUX 312 of in-flight counter 312 couple LOOP_BR unaltered to terminal counter 314, where it is used to update N_TO_ISSUE.

When L_TERM is first asserted, termination counter 214 receives the current value of N_IN_FLT along with an indication of the number of iterations of the loop still to be retired (N_TO_RET). Termination counter 214 adjusts N_TO_RET to reflect the number of loop branches in flight (N_IN_FLT), providing a signal (N_TO_ISSUE) that represents the number of loop branches still to be issued. Thereafter, N_TO_ISSUE is decremented by counter 312 each time a valid loop branch (BR_VLD) reaches buffer 140. N_TO_ISSUE is used by EOL module 230 to detect the terminal iteration of the loop.

The disclosed embodiment of termination counter 314 includes a MUX 324 and an adder 328. One input of adder 328 receives N_IN_FLT from in-flight counter 212 when termination mode is entered. Thereafter, it receives an indication of each valid loop branch that reaches buffer 140. On assertion of L_TERM, MUX 324 couples N_TO_RET to adder 328, which subtracts N_IN_FLT to provide N_TO_ISSUE. Thereafter (when L_TERM is deasserted), MUX 324 couples the output of termination counter 314 (N_TO_ISSUE) to adder 328, which adjusts it to reflect any additional loop branches that have reached buffer 140 in the interim.

EOL module 230 receives N_TO_ISSUE and compares it with one or more selected threshold values. For one embodiment, the threshold values indicate when to initiate a resteer signal in anticipation of the end of the loop. Depending on the type of loop being predicted, threshold values of 0, 1, and 2 are compared with N_TO_ISSUE. EOL module 230 generates a resteer signal (RESTEER), when N_TO_ISSUE matches one of the threshold value.

The disclosed embodiment of EOL module 330 includes three comparators 331–333, four AND gates, 334, 335, 336, 337, and OR gate 338. Comparators 301–303 compare the threshold values 0, 1, and 2, respectively, with the current value of N_TO_ISSUE. Their outputs are coupled to inputs of AND gates 334–336, respectively, which are enabled by T_MODE. AND gate 336 must also be enabled by LOOP_BR, which is asserted when a loop branch is detected in pipe stage 302. For selected loop branch configurations, AND gate 336 eliminates timing constraints that would otherwise be present when two loop branches occur in close succession.

OR gate 338 asserts a signal (MATCH) to AND 337 when any of the threshold values has been reached. The output of AND 337 is a signal (END) that is asserted when L_BR and MATCH are asserted concurrently. The effect of asserting END may depend on the type of loop being processed. For one embodiment, the branch prediction provided by BPS1 for CLOOP, CTOP and WTOP loops is TK. Asserting END may alter the predicted direction to NT, or it may trigger branch decoder 160 to ignore the predicted TK direction and resteer pipeline 100 to the fall through address. For example, a resteer module in branch decoder 160 may provide the resteer address to IP MUX 250 when END is asserted. For the case of a CEXIT or WEXIT loop, the branch prediction provided by BPS1 is NT. Asserting END may alter it to TK, or it may otherwise trigger a resteer to the branch target address.

FIG. 3B shows another embodiment of loop prediction pipeline 300' in accordance with the present invention. Loop prediction pipeline 300' employs a single counter 350 having logic to enable two different counting modes. In this embodiment, the functions of in-flight counter 312 and termination counter 314 are incorporated in a counter 350 that is capable of operating in two modes, in-flight mode and termination mode. Control module 240 and EOL module 230 are substantially the same as in FIG. 3A. The following discussion focuses on operation of dual mode counter 350.

Dual mode counter 350 includes a MUX 354, MUX control logic 358, first and second adders 360, 362, and increment/decrement blocks 368, 370. MUX control logic monitors T_MODE, BR_RET, L_TERM, BR_VLD, and L_BR signals, and selects an output for MUX 354 from one of its inputs, according to the states of the monitored signals. The output of MUX 354 may represent N_TO_ISSUE or N_IN_FLT, depending on the mode in which counter 350 is operating.

MUX 354 receives as inputs (1) logical zero, (2) a copy of its output, (3) a decremented copy of its output; (4) an incremented copy of its output, (5) an output of adder 360, and (6) an output of adder 364. The output of adder 360 provides the difference between N_TO_RET and the current value at the output of MUX 354, e.g. N_IN_FLT. The output of adder 364 provides the difference between N_TO_RET and an incremented copy of the output of MUX 354. One of the adder output values is selected to determine N_TO_ISSUE when counter 350 transitions from its first mode to its second mode.

In operation, MUX control module 358 triggers MUX 354 to provide 0 at its output until CNTR_ON is asserted, at which point counter 350 enters a first mode (in-flight mode). In first mode, counter 350 tracks N_IN_FLT at its output 352 by incrementing (via block 370) or decrementing (via block 368) the value at output 352 depending on the states of signals L_BR, BR_VLD, and BR_RET. For example, when a valid branch enters queue, L_BR is asserted, BR_VLD, and the incremented value is provided to output 352. When a branch retires, BR_RET is asserted, and the decremented value is provided to output 352.

When T_MODE is asserted, counter 350 switches to a second mode (termination mode). When T_MODE is asserted, MUX control module 358 causes MUX 354 to couple the output of adder 360 or adder 364 to counter output 352. The value is the difference between N_TO_RET and N_IN_FLT or N_TO_RET and an incremented value of N_IN_FLT. The first represents the number of loop branches still to be issued when there is no loop branch in pipe stage 301. The second represents the number of loop branches still to be issued when there is loop branch in pipe stage 301. The various inputs to MUX 354 and the conditions under which they are selected are summarized in Table 1.

TABLE 1

| MUX INPUT | FIRST MODE | SECOND MODE |
| --- | --- | --- |
| 0 | MOV_TO_LC, MOV_TO_EC, Back End Flush | MOV_TO_LC, MOV_TO_EC, Back End Flush |
| C | Non-loop events | Non-loop events |
| C − 1 | BR_RET Asserted | L_BR Asserted |
| C + 1 | L_BR Asserted | NA |
| N_TO_RET − C | L_TERM Asserted & L_BR Not Asserted | NA |
| N_TO_RET − (C + 1) | L_TERM & L_BR Asserted | NA |

Here, C represents the value at the output of MUX 354. This value is N_IN_FLT when counter 350 is in first mode.

Figure 4:
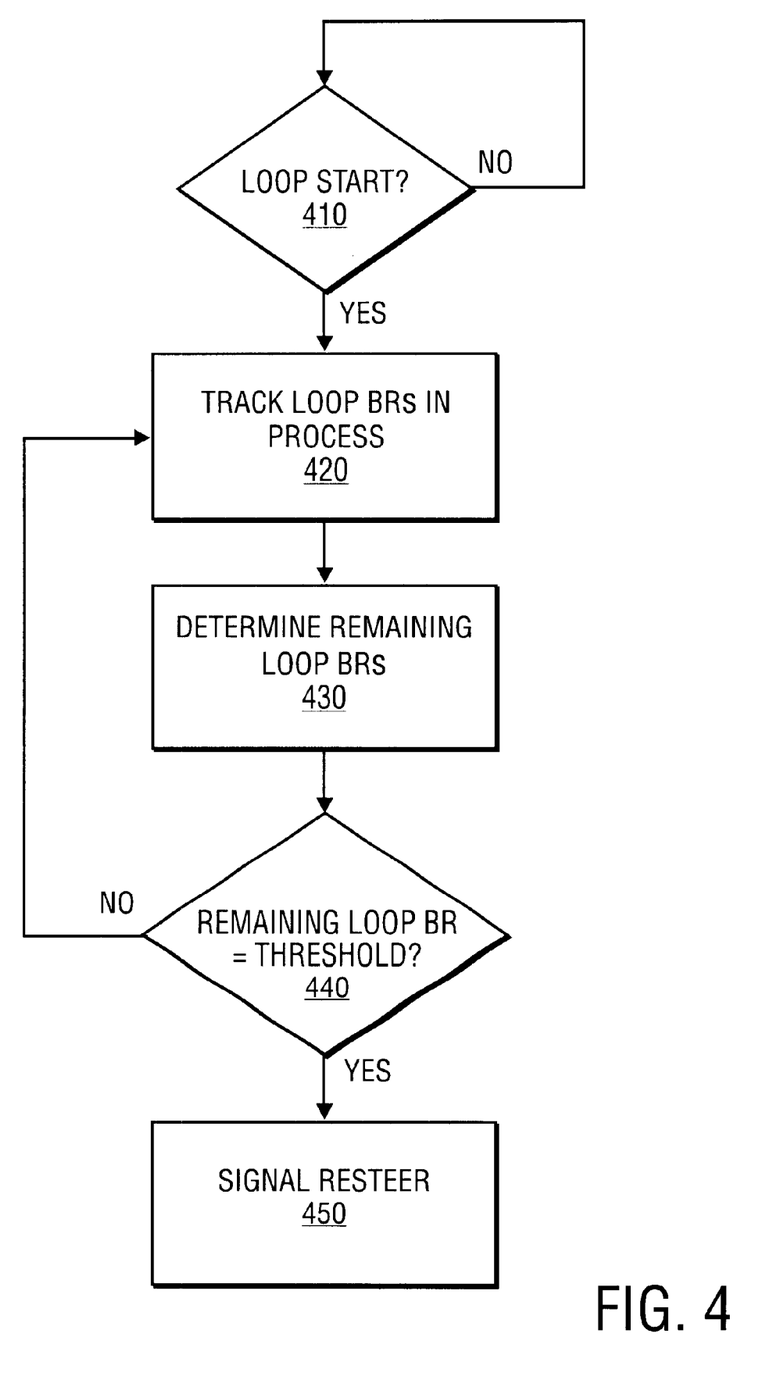
FIG. 4 is an overview of a method for predicting loop branches in accordance with the present invention.

FIG. 4 is an overview of a method 400 for predicting loop branches in accordance with the present invention. Method 400 is initiated 410 when the start of a loop is detected. This may be done, for example, by monitoring one or more counters that are used to track the status of loops and initiating method 400 when one of these counters is initialized. Following initiation, loop branches are tracked 420 through various stages of the process pipeline. In one embodiment of the invention, loop branches that have been issued to various execution resources and loop branches that have been retired are tracked separately. The number of loop branches remaining to be issued is then determined 430 from the tracked loop branches and available loop data. The loop branches remaining to be issued are compared 440 against one or more threshold values. If the comparison generates a match, a resteer signal is generated 450. Otherwise, method 400 continues tracking 420 loop branches.

Figure 5:
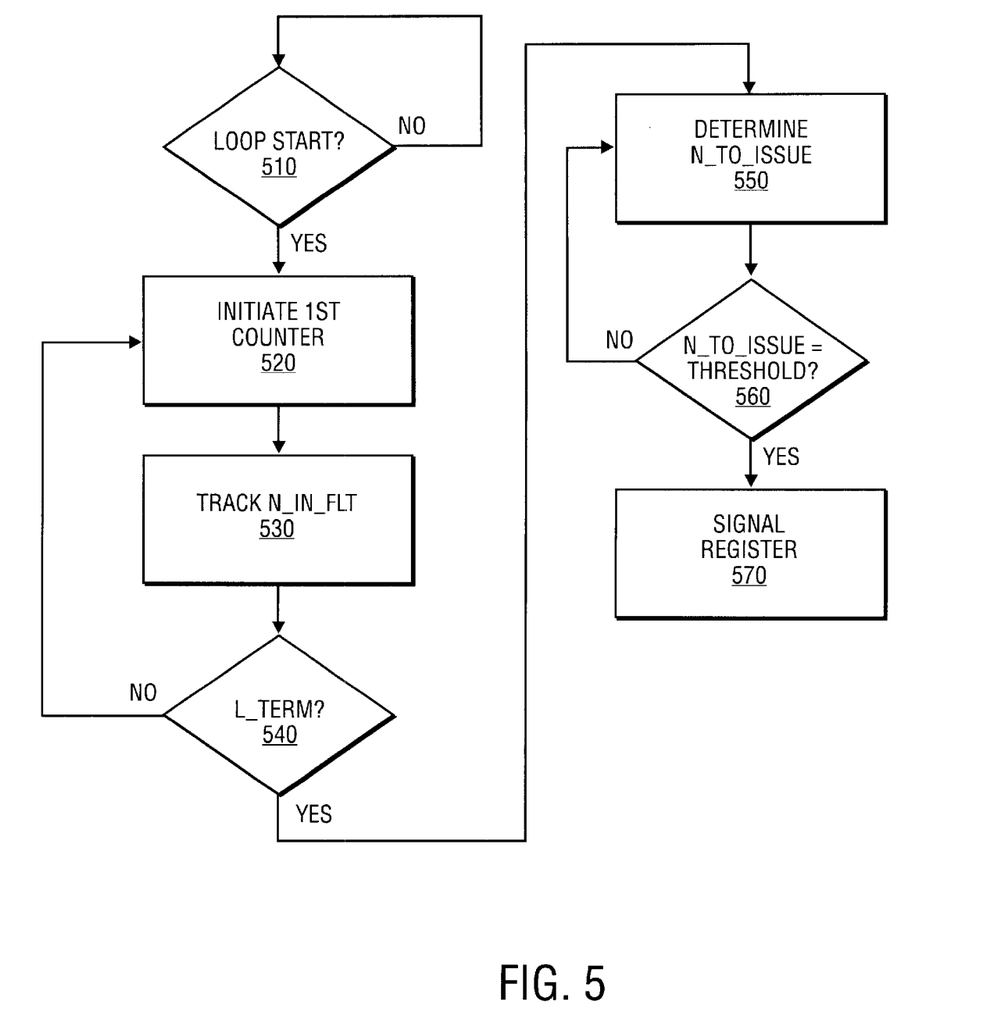
FIG. 5 is a flowchart of one embodiment of the method shown in FIG. 4.

FIG. 5 represents one embodiment of method 400. When a loop start is detected 510, a first counter is initiated 520. The first counter tracks the number of loop branches that have been issued but not yet retired, e.g. N_IN_FLT. For one embodiment, this is accomplished by incrementing the first counter each time a loop branch is fetched to an instruction buffer and decrementing the counter each time a loop branch is retired. In addition to tracking 530 in process loop branches, a branch termination signal is checked 540 to determine whether loop is close to its final iteration. This may be determined, for example, by monitoring the EC counter and asserting L_TERM when EC indicates that the loop pipeline is starting to empty.

When the loop approaches its final iteration 540, the number of loop branches still to be issued is determined 550. For one embodiment, this is done by reducing the number of loop branches still to be retired (N_TO_RET) by the number of loop branches in process (NI_N_FLT) and thereafter updating N_TO_RET as additional loop branches are issued, e.g. L_BR is asserted.

The issued loop branches can be monitored in the front part of the pipeline. Consequently, the number of loop branches still to be issued is useful for predicting the end of the loop, since pipeline resteering is handled in the front end of the pipeline. In the disclosed embodiment, this is accomplished by comparing 560 the number of loop branches remaining to be issued with one or more threshold values. If a match is detected 560, a resteer signal is generated and the predicted target address is overwritten by the resteer address. If no match is detected 560, determining step 550 is repeated. In the disclosed embodiment, steps 550 and 560 represent termination mode.

There has thus been provided a system and method for predicting loop branches and, in particular, for predicting the termination of loop branches to eliminate a misprediction on the terminating branch. The system employs a counter to track the number of in-flight loop branches and the number of loop branches that remains to be issued. The number of remaining loop branches is compared with one or more threshold numbers and a resteer signal is generated when a match is detected. In one embodiment, a control module deactivates the first counter and activates the second counter and the comparison logic when the branch nears termination.

What is claimed is:

1. A system comprising:
a branch execution module including a loop status counter to be initialized to a status value that indicates an initial state of a loop, the status value to be adjusted responsive to retirement of one or more branch instructions of the loop;
a first instruction counter to track a number of branch instructions in-flight for the loop;
a second instruction counter to be initialized to a count value adjusted for the tracked number of in-flight instructions, responsive to the status value reaching a first value, and to subsequently track a number of branch instructions to be issued for the loop; and
an end-of-loop (EOL) module to signal a change in a predicted branch direction for the loop, responsive to the number of loop branch instructions to be issued reaching a threshold value.

2. The system of claim 1, wherein the initial count value of the second instruction counter represents a number of branch instructions to be retired less the tracked number of in-flight branch instructions.

3. The system of claim 2, wherein the branch execution module determines the number of branch instructions to be retired, responsive to the loop status value reaching the first value.

4. The system of claim 3, wherein the first value indicates the loop is switching to an epilog state.

5. The system of claim 1, wherein the loop status counter includes an epilog counter that is initialized to a value indicating a number of stages for a software pipelined loop.

6. The system of claim 1, wherein the loop status counter includes an epilog counter and a loop counter that indicate a number of stages and a number of iterations, respectively, for a software pipelined loop.

7. The system of claim 1, wherein the first value of the loop status counter indicates a transition to an epilog for the software pipelined loop.

8. The system of claim 1 wherein the first and second instruction counters are provided by first and second modes of a dual mode instruction counter.

9. A method for predicting termination of a loop comprising:
initializing a loop status value to indicate an initial state for a loop;
adjusting the loop status value responsive to retirement of one or more branch instructions of the loop;
tracking a number of in-flight branch instructions for the loop;
responsive to the loop status value indicating a new state for the loop, determining a number of branch instructions to be issued for the loop, using the tracked number of in-flight branch instructions;
tracking the number of branch instructions to be issued; and
responsive to the tracked number of branch instruction to be issued reaching a second value, altering a predicted direction for a next branch instruction to terminate the loop.

10. The method of claim 9, wherein determining a number of branch instructions to be issued for the loop comprises;
determining a number of branch instructions to be retired; and
adjusting the number of branch instructions to be retired by the number of branch instructions in flight.

11. The method of claim 10, wherein the number of branch instructions to be retired is indicated by the loop status value.

12. The method of claim 9, wherein the loop is a software pipelined loop and initializing the loop status value to indicate an initial state of the loop comprises initializing the loop status value to indicate all stages of the software pipelined loop are active.

13. The method of claim 9, wherein the initial state of the loop is a non-epilog state and the new state of the loop is an epilog state.

14. A branch prediction system:
a loop status counter to track a state associated with a software pipelined loop, the counter to be initialized with a status value that indicates a first state for the software pipelined loop;
a branch execution unit associated with the loop status counter to update the status value responsive to retirement of one or more branch instructions of the software pipelined loop and to indicate a number of branch instructions to be retired for the software pipelined loop, responsive to the status value reaching a first value;
a loop branch predictor to track a number of in-flight branch instructions responsive to the software pipelined loop being in the first state and to track a number of branch instructions to be issued responsive to the software pipelined loop being in a second state indicated by the first value of the status value, the loop branch predictor to signal a new predicted branch direction for the software pipelined loop, responsive to the number of branch instructions to be issued reaching a second value.

15. The system of claim 14, wherein the loop predictor includes a first counter to track the number of in-flight instructions and a second counter to track the number of instructions to be issued, the second counter to be initialized to a count value determined from the number of in-flight instructions and the number of instructions to be retired, responsive to the status value reaching the first value.

16. The system of claim 15, further comprising a control module to detect the software pipelined loop switching to the second state and to activate the second counter responsive to the switch.

17. The system of claim 16, wherein the first state of the software pipelined loop is a non-epilog state and the second state of the software pipelined loop is an epilog state.

18. The system of claim 14 wherein the loop status counter includes an epilog counter, the second state of the software pipelined loop is an epilog state, and the first state of the software pipelined loop is a non-epilog state.

19. The system of claim 14, wherein the loop status counter includes a loop predicate that has the first value if the software pipelined loop is in an epilog state and has a complement of the first value if the software pipelined loop is in a non-epilog state.

20. An apparatus comprising:
a branch execution module to store a status value initialized to indicate a first state of a loop, the branch execution module to execute branch instructions of the loop, to update the status value as the branch instructions are executed, and to determine a number of branch instructions to be retired, responsive to the status value indicating a second loop state;
a loop predictor to track in-flight branch instructions for the loop, during the first loop state, the loop predictor to track branch instructions to be issued, responsive to the status value indicating the second loop state, the branch instructions to be issued being initialized to a difference between the branch instructions to be retired and the in-flight branch instructions; and
an end of loop (EOL) module, to complement a predicted branch direction for the loop, responsive to the branch instructions to be retired reaching a threshold value.

21. The processor of claim 20, wherein the branch execution module determines the number of branch instructions to be retired using the status value, responsive to the status value indicating the second loop state.

22. The processor of claim 20, wherein loop predictor includes an instruction counter to track the in-flight branch instructions in a first mode and to track the branch instruction to be issued in a second mode.

23. The processor of claim 20, wherein the status value represents one or more of a loop count, an epilog count and a loop predicate, the first loop state is a non-epilog state; and the second loop state is an epilog state.

* * * * *

UNITED STATES PATENT AND TRADEMARK OFFICE
CERTIFICATE OF CORRECTION

PATENT NO. : 6,438,682 B1
DATED : August 20, 2002
INVENTOR(S) : Morris et al.

It is certified that error appears in the above-identified patent and that said Letters Patent is hereby corrected as shown below:

Column 1,
Line 65, delete "fmal", insert -- final --.

Column 7,
Line 60, delete "214", insert -- 314 --.

Signed and Sealed this

Sixth Day of April, 2004

JON W. DUDAS
*Acting Director of the United States Patent and Trademark Office*